(12) United States Patent
Shapiro

(10) Patent No.: US 7,938,533 B2
(45) Date of Patent: May 10, 2011

(54) EYEGLASS FRAME WITH AT LEAST ONE CARABINER

(76) Inventor: Samuel R. Shapiro, Monroeville, PA (US)

( * ) Notice: Subject to any disclaimer, the term of this patent is extended or adjusted under 35 U.S.C. 154(b) by 0 days.

(21) Appl. No.: 12/462,100

(22) Filed: Jul. 29, 2009

(65) Prior Publication Data

US 2010/0110366 A1    May 6, 2010

Related U.S. Application Data

(60) Provisional application No. 61/197,838, filed on Oct. 31, 2008.

(51) Int. Cl.
*G02C 5/14* (2006.01)
(52) U.S. Cl. .......... 351/112; 351/121; 351/158
(58) Field of Classification Search .......... 351/41, 351/111, 112, 121, 158
See application file for complete search history.

(56) References Cited

U.S. PATENT DOCUMENTS 7,556,374 B1 *  7/2009  Cooper .......... 351/158

* cited by examiner

*Primary Examiner* — Huy K Mai
(74) *Attorney, Agent, or Firm* — Gary P. Topolosky

(57) ABSTRACT

An eyeglass frame comprises: (a) a main lens frame for holding one or more optical lenses, said lens frame having opposed lateral ends; (b) means for attaching the main lens frame to the wearer's head when in use; and (c) a carabiner clip extending from either: one lateral end of the main lens frame, or from the main lens frame attaching means. The carabiner clip has at least 3 sides, at least one of said sides including a bar connected to an adjacent clip side with spring biasing for defining a securely closed position for said clip. This eyeglass frame is particularly suitable for use as reading or other vision correcting glasses, sunglasses, safety glasses, sportswear, a fashion accessory and combinations thereof.

21 Claims, 6 Drawing Sheets

EYEGLASS FRAME WITH AT LEAST ONE CARABINER

CROSS-REFERENCE TO RELATED APPLICATION

This application claims priority to U.S. Provisional Application Ser. No. 61/197,838, filed on Oct. 31, 2008 and entitled "Improved Eyeglass Frames", the disclosure of which is fully incorporated by reference herein.

FIELD OF THE INVENTION

The present invention relates to improvements in eyeglass frames. These frames support eyeglasses worn for vision correction, reduction of glare encountered with exposure to bright light, reading, workplace safety, sports, and/or recreational activities. A main aspect of this invention relates to an integral carabiner, or D-clip, for attaching eyewear frames to a user's clothing, belt loop, backpack, purse or other carried article.

BACKGROUND OF THE INVENTION

Eyeglass frames traditionally include a front portion or lens frame connected at opposed lateral ends with side pieces or temples. Each temple has a forward facing hinge (or other connector) end and a rearward facing earpiece end.

For anyone who has worn glasses for corrective vision, and for those who wear glasses for safety and/or sun shading, one of the more common complaints is that the glasses get lost when not worn. Many individuals have worn bands for suspending glasses around their necks when not in use. Others have been known to flip unworn glasses up for "riding" on their upper foreheads, or possibly resting in their hair.

Still others have considered storing unused eyeglasses on their person, but not in a storage case per se. The most commonly used storage area is the pocket of a dress shirt or other apparel item. In order to prevent glasses from sliding or falling out of such pockets, numerous clip means have been conceived and patent protected. Schmitt U.S. Pat. No. 1,779,015 was one of the first to include a firmly mounted clip nearest the front hinge region to the temple arm of an eyeglass frame. Marvin U.S. Pat. No. 1,787,830 located a similar clip further back along the temple arm for storing other items including writing utensils.

The hinge to one of the temple arms of Hon U.S. Pat. No. 2,097,371 included a purposeful clasp. McCormick U.S. Pat. No. 6,017,120 added an aesthetic hook or clip to the outside of one temple arm, said clip intended to match the rest of the temple arm in color and material of manufacture.

Others have patented after-market clips for including with many makes and models of eyeglass frame temples. McDonald U.S. Pat. No. 1,898,059 included one type of clip that could be slid to various points along the temple arm. Nagel U.S. Pat. No. 1,973,648 included an attachment fob that not only clipped to the frame wearer's shirt pocket; it also engaged with the opposite temple arm when the eyeglasses were folded "closed". Zipper U.S. Pat. No. 3,883,236 disclosed several shapes of temple arm clips, some permanent and others removable and reuseable. And DiFranco U.S. Pat. No. 4,903,375 showed a plastic spring bar-type clip for attaching to a temple arm with a pair of O-ring connectors.

A spring-loaded, add-on clip from Kren U.S. Pat. No. 5,414,906 incorporated clamping jaws. And Challender U.S. Pat. No. 6,029,319 included a spring-biased clip in one front corner of his eyeglass frame temple. Resendez, Sr. U.S. Pat. No. 6,045,221 added a garment-locking protrusion and recess near one end of his frame attaching clip. Should the wearer desire a wider spread for attaching unworn glasses to an automotive sunshade or the like, Maxson U.S. Pat. No. 3,038,377 provided a frame clasp that was both hinged and spring loaded.

More recently patented configurations have included clip means that are capable of pivoting about the temple component for shirt pocket mounting when not in use. See, for example, Fukai U.S. Pat. No. 6,543,895 and Goldman et al. U.S. Pat. No. 6,854,845.

What is needed is an inexpensive means for securely attaching eyeglass frames to one's person, said securing means not becoming easily undone. A mere spring clip along the frame temple does not suffice. A spring loaded clip that completely closes about the attachment element, a belt loop, necklace, purse buckle, etc. provides greater security from being lost or otherwise getting disconnected. This invention would enable hunters, fishermen and other outdoorsmen to keep better track of their vision equipment. The same can be advantageously used by military, police, firemen and other rescue personnel.

SUMMARY OF THE INVENTION

In a first aspect of improved eyewear in accordance with this invention, there is provided an eyeglass frame comprised of: (a) a main lens frame for holding one or more optical lenses, said lens frame having opposed lateral ends; (b) means for attaching the main lens frame to the wearer's head when in use; and (c) a carabiner clip extending from either: one lateral end of the main lens frame, or from the main lens frame attaching means, said carabiner clip having at least 3 sides, at least one of said sides including a bar connected to an adjacent clip side with spring biasing for defining a securely closed position for said carabiner clip. This eyeglass frame is particularly suitable for use as reading or other vision correcting glasses, sunglasses, safety glasses, sportswear, a fashion accessory and combinations thereof.

One embodiment uses a carabiner clip sized for insertion in a recess in one of the frame's two temple components when not in use. When that carabiner clip is being stored, its outer edge portions are adjacent inner edge portions of that temple recess. The clip has at least 3 sides, one of which includes a metal bar attached with a pivot pin. Ideally, that carabiner clip is maintained in the temple recess with a snap fit. When needed, this clip can extend outwardly from the temple recess and then securely attach to one or more looped items on the wearer's wardrobe or other accessory item.

Another aspect of the invention is an eyeglass frame including a lens frame and at least one temple, in which a carabiner clip is integrally formed with at least one temple. Several variations of the carabiner clip are shown. Preferred embodiments of carabiner clips are made from plastic, metal, or various combinations of plastic and metal.

BRIEF DESCRIPTION OF THE DRAWINGS

Further features, objectives and advantages of the present invention will become clearer when referring to the following detailed description of preferred embodiments made with reference to the accompanying drawings in which.

DETAILED DESCRIPTION OF PREFERRED EMBODIMENTS

Figure 1A:
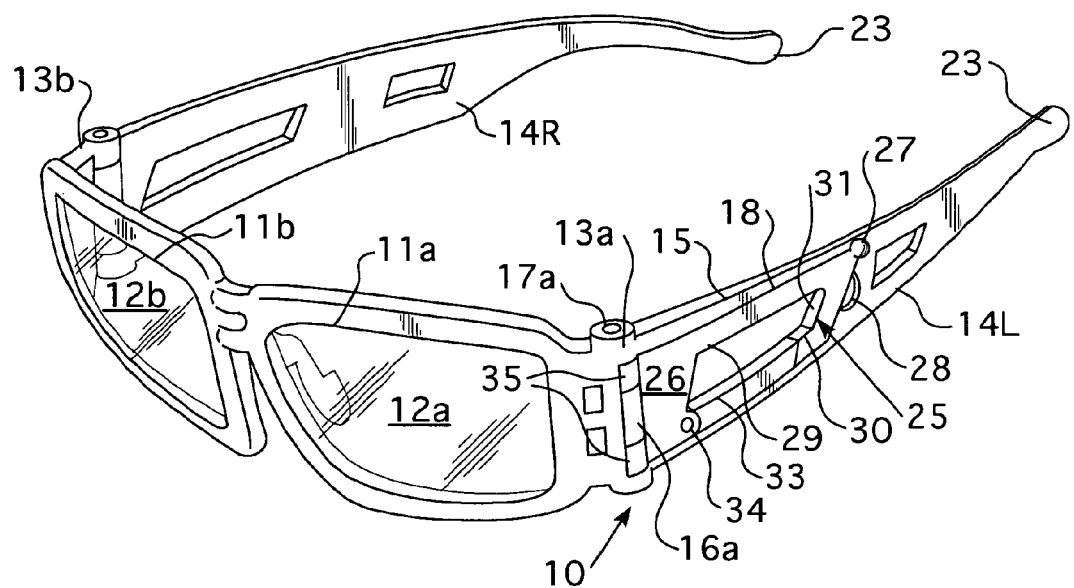
FIG. 1A is a left front, perspective view of one embodiment of eyeglass frame having a recessed carabiner clip in its left frame temple.

It should be noted that common features in the different views of this invention are shown with the same reference numeral(s). For alternate embodiments of the same component, there is consistent numbering though in the next hundred series. When referring to any numerical range herein, it should be noted that all numbers within the range, including every fraction or decimal between its stated minimum and maximum, are considered to be fully designated and disclosed by this description. As such, disclosing a preferred clip size ranging from about 25-35 millimeters in length expressly covers clip sizes of 26, 27.5, 29 mm . . . and so on, up to about 33, 34 and 34.75 mm. For the same embodiment, typical clip heights may range from about 12-22 mm and total clip depths about 35-60% of the total template depth, or about 1.5-3 mm, with all intermediate numerical and/or quantitative values between being expressly covered thereby.

As used herein, the term "carabiner" means a loop with a spring or screw gate. These same devices have also been called crab rings, D-rings, snap links, or "biners" for short. On occasion, the loop can be made from a sturdy, mostly rigid plastic. More often, the carabiner's loop component is made from metal, typically 7075 aluminum. The loop part opposite the gate is often called the spine. It is meant to quickly and reversibly connect components. There are two main types of carabiners, non-locking and locking. The non-locking types have a spring (i.e., swinging gate) that can be pressed open to insert a connecting rope, strap, etc. before shutting under the spring's pressure. Locking carabiners can have the same general shape as their non-locking counterparts but with an additional sleeve around the gate. The sleeve meant for releasing along at least partially over the gate can be auto-locking. Alternately, that sleeve can include a manual screw or twist-lock.

Referring now to FIGS. 1A through 1D there is shown a first embodiment of eyeglass frame according to this invention. Therein, the eyeglass frame has one integral carabiner clip from the left temple to that frame. It should be understood, however, that the invention should not be limited to left temple carabiner clips only. The clip could just as easily extend from only the right temple component, or from both temples for greater flexibility in storage options when the frames are not in use.

The eyeglass frame itself can be made from plastic, metal or a combination of materials. Suitable metals include nickel-silver, Monel, titanium, beryllium, stainless steel, flexon, aluminum and memory metal. Suitable plastics include TR90, Zyl, a cellulose acetate and zylonite blend, a cellulose propionate, a polycarbonate, a nylon, and Grilamide™. Other high end frame materials include: wood, bone, buffalo horn, gold and sterling silver.

In FIGS. 1A through 1D, lens frame, generally 10, includes a pair of laterally spaced apertures or openings 11a, 11b for holding lenses 12a, 12b, respectively. Lens frame 10 has opposed lateral ends attached to connecting end pieces 13a, 13b, with left and right temples 14L, 14R attached to said end pieces 13a, 13b. At least one of the temples (14L or R) includes a body component 15 joined to end piece 13a by a hinge 16a with its own hinge pin 17a. Within body component 15, there is defined a recessed region 18 having a top inner lip 19, bottom inner lip 20 and at least one lateral inner lip 21. As shown, this embodiment includes both a rearward-facing lateral lip 21 and a forward facing lateral lip 22. Both temples 14L and 14R terminate in an over-the-ear end portion 23. It is understood that an alternate variation of this invention may include a solid left and right temple still with a carabiner recess in one of the temples; the only difference being that said recess would not pass completely through its particular left or right temple.

A carabiner clip 25 is sized for inserting into the temple body's recessed region 18. When the carabiner clip 25 is closed, its outermost face portions 26 are adjacent to (i.e. substantially flush with) the inner edge portions 19-21 of recessed region 18. For keeping clip 25 secure in recessed region 18 when not in use, there is provided a raised nipple or detent 27. Preferably, there is further included at least one nail bevel or indent 28 about the perimeter of recessed region 18. The latter bevel may be used for accessing a side of the clip 25 when attempting to free it from its secured position within recessed region 18.

As shown, carabiner clip 25 has at least three sides: a top side 29, bottom side 30, and at least one inner lateral side 31.

Depending on the overall shape of carabiner clip used, there may be a fourth, or outer lateral side 32 as well. Along one of the main clip sides, bottom side 30 includes a bar 33 attached to inner lateral side 31 by a pivot pin 34. A spring means (not shown) biases bar 33 into a "closed" position. Temple body component 15 and carabiner clip 25 each include connectors 35 for at least partially circumscribing hinge pin 17a.

Figure 1B:
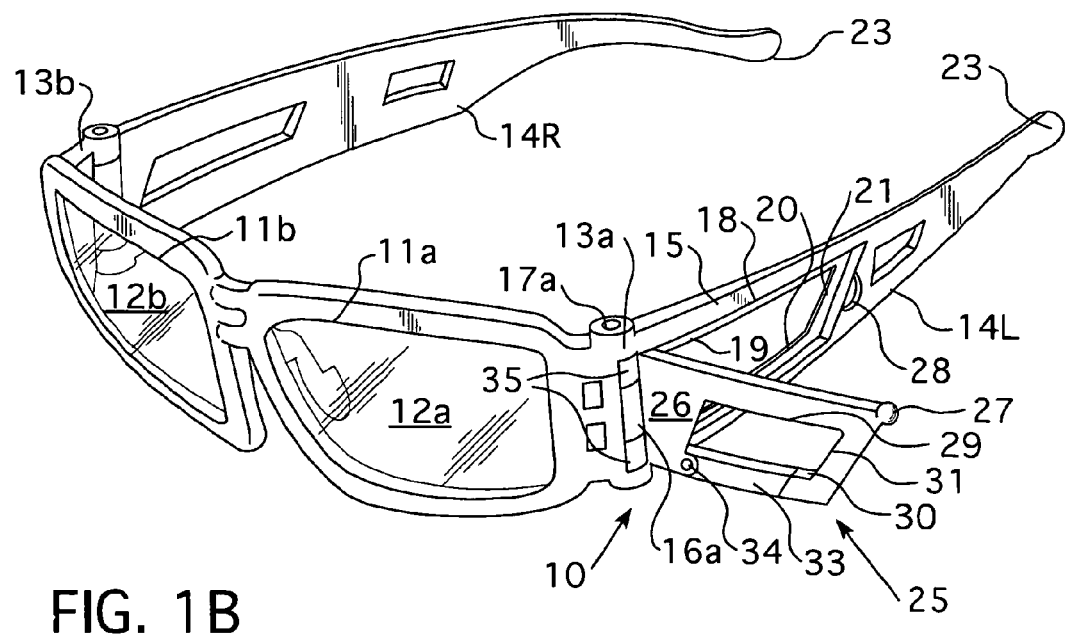
FIG. 1B is a front, perspective view of the eyeglass frame from FIG. 1A, showing the carabiner clip hinged outwardly from the rest of the left frame temple.
Figure 1C:
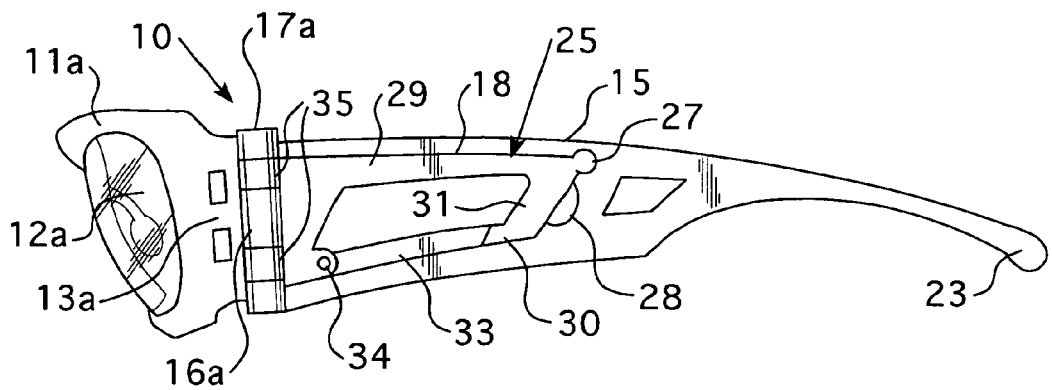
FIG. 1C is a side elevational view of the eyeglass frame from FIG. 1A with the carabiner clip recessed in its left frame temple.
Figure 1D:
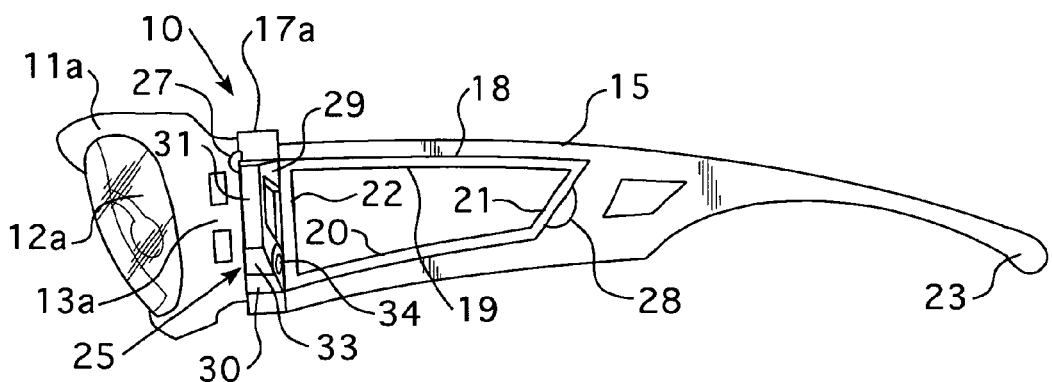
FIG. 1D is a side elevational view of the FIG. 1C eyeglass frame with the carabiner clip outwardly extended to show the lipped recess in its left frame temple.
Figure 1E:
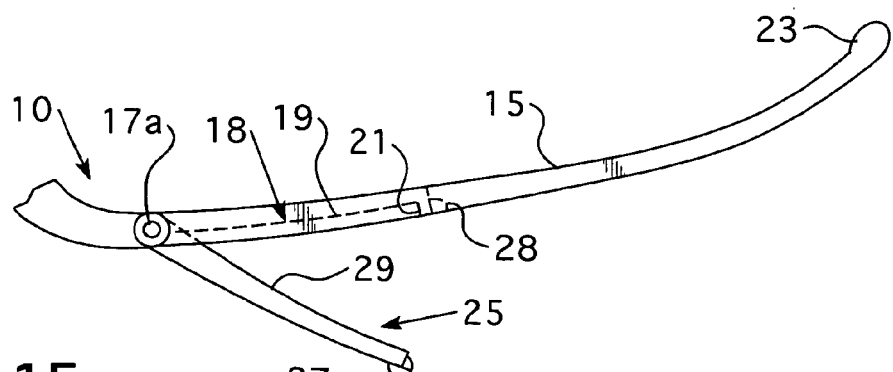
FIG. 1E is a fragmentary, top elevational view of the eyeglass frame from FIG. 1A with the recessed carabiner clip extended outward from its common hinge with the left frame temple.

FIG. 1B shows the carabiner clip 25 "folded out" or displaced from recessed region 18 so that it is available for attachment (by clipping) directly to clothing, a keychain, purse or necklace worn by the eyeglass wearer. FIGS. 1C through 1E illustrate the manner in which carabiner clip 25 swings out, substantially horizontally, from its normally closed position within the recessed region 18 of temple body component 15.

Figure 2A:
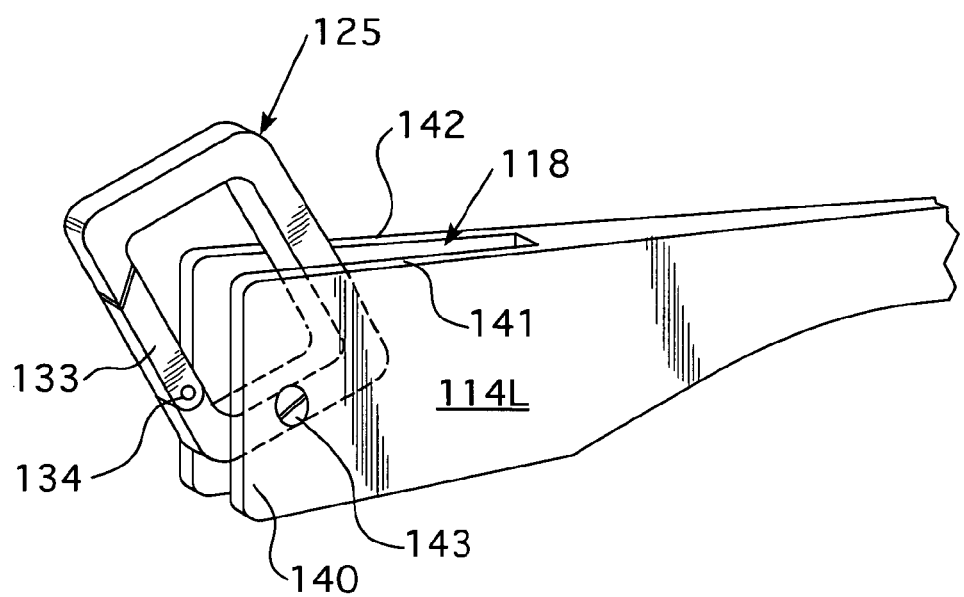
FIG. 2A is a left front, perspective view of one alternate embodiment of frame temple according to this invention wherein the carabiner clip is pivotally mounted to rotate upwardly and outwardly when that frame temple is in a closed position.

FIG. 2A shows a first alternative to the main embodiment of FIGS. 1A through 1E. In this first alternative, only one of the two main temples, left temple 114L is shown in a fragmented, perspective view, from the hinge or connector end of that temple. When left temple 114L is in a closed position, or otherwise folded onto the main frame body and adjacent the other folded in, right temple (not shown), the forward facing edge 140 to that temple component can incorporate a slotted recess 118 that is sandwiched between left 141 and right 142 portions of forward edge 140. It should be noted that left and right portions 141, 142 may be commonly sized, or unbalanced so as to provide greater protection to the carabiner clip 125 from a more vulnerable outer edge. Within the slotted recess 118, pivotally mounted clip 125 is secured via side temple pin 143. Notably, mounted clip 125 includes its own bar 133 and pin 134 as shown.

Figure 2B:
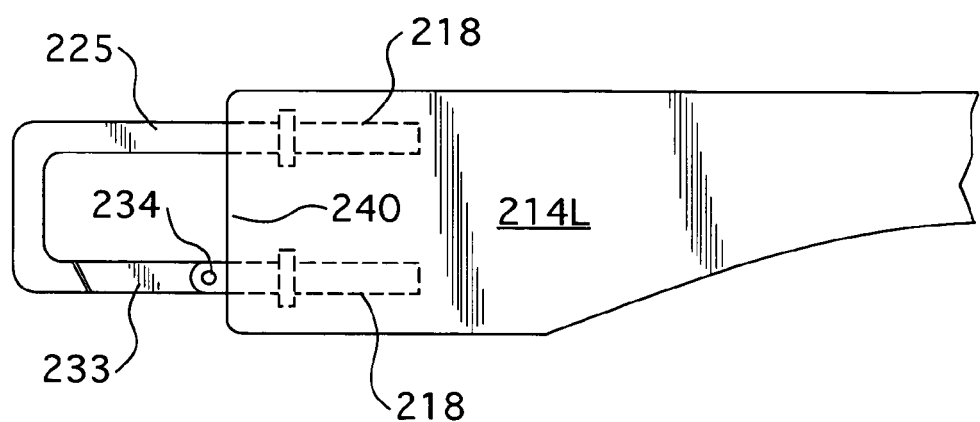
FIG. 2B is a partial side schematic of a second alternate embodiment of frame temple having a slidably mounted carabiner clip for extending outwardly when that frame temple is in a closed position.

FIG. 2B shows a second alternative to that of FIG. 2A wherein left temple component 214L includes its own recess 218 from which a slidably mounted carabiner clip 225 can be extracted from its forward edge 240 once the temple is duly closed. Notably, sliding clip 225 includes its own bar 233 and pin 234.

Figure 3A:
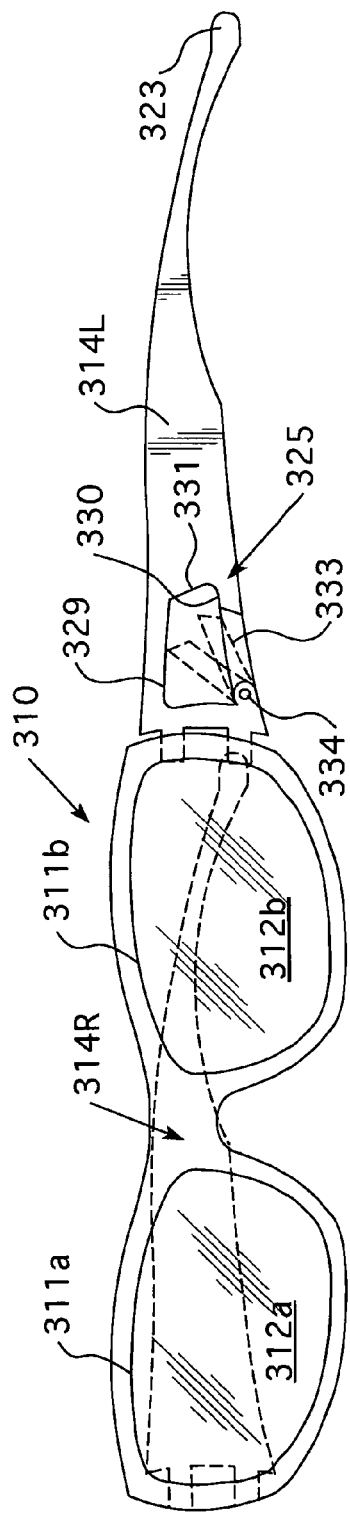
FIG. 3A is a front plan view showing a third alternate embodiment of this invention having a carabiner clip integrally formed into a lower section of its left frame temple.
Figure 3B:
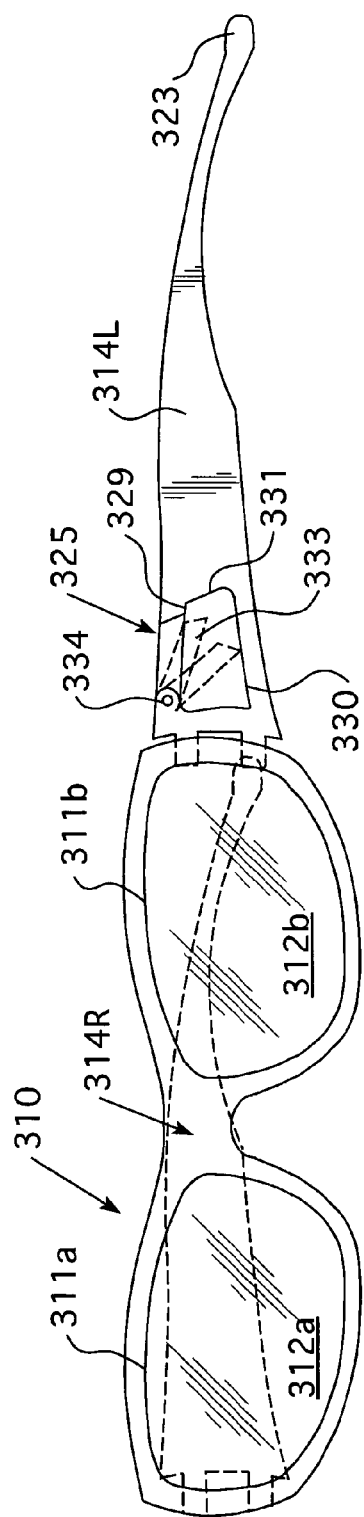
FIG. 3B is a front plan view showing an alternative to the second embodiment with a carabiner clip integrally formed into the upper section of its left frame temple.

FIGS. 3A and 3B show a third alternative embodiment wherein eyeglass frame 310 with openings 311a, 311b for lenses 312a, 312b includes from its left connecting end piece 313a a left temple 314L joined to same via hinge 316a and a hinge pin, not shown. The folded over (or closed) right temple 314R is shown in silhouette behind lenses 312a and 312b of frame 310 in both two views. For this third main configuration, the carabiner clip 325 does not hide/rest within a recess of left temple 314L. Rather it is an integral component of same. As such, clip 325 includes its own bar 333 and pivot pin 334. The differences between these two alternate embodiments, however, rests in where that bar portion is situated. FIG. 3A shows bar 333 along the lowermost or bottom side 330 of clip 325. In FIG. 3B, the same bar 333 would swing inwardly from the top side 329 of clip 325.

Figure 4:
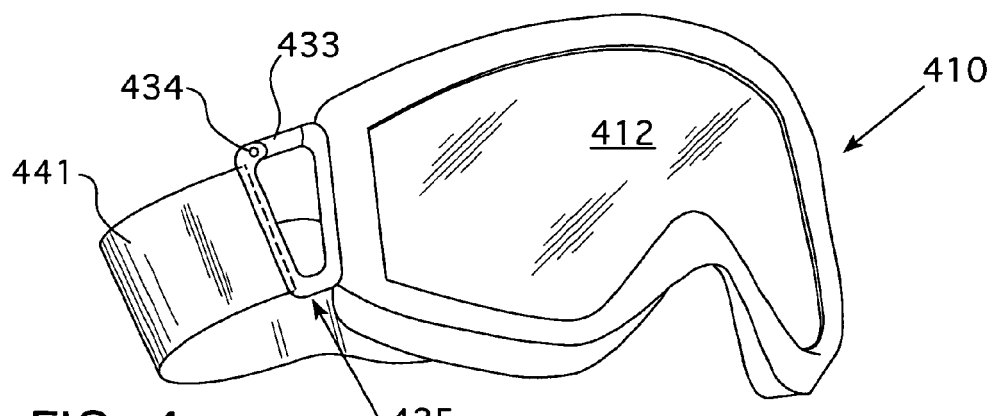
FIG. 4 is a right front perspective view of a pair of ski goggles having a carabiner clip incorporated into the right frame elastic band connector.

The integral carabiner clip for eyeglass frames is best suited for extending outwardly from one or more temple elements. Not every glass frame has left and right temples, however. FIG. 4 schematically shows an elastically held eyeglass protector for skiing or many other athletic activities. This invention may include an integral carabiner clip for these types of frames as well. In FIG. 4, frame 410 has a single lens 412. From one end of that frame, there is shown a connector 430 for holding one end of elastic strap 441. The other strap end (not shown) connects to the opposite end of frame 410. From either end of such ski goggles, there can be incorporated its own carabiner clip 425, with a bar 433 and pivot pin 434.

Figure 5:
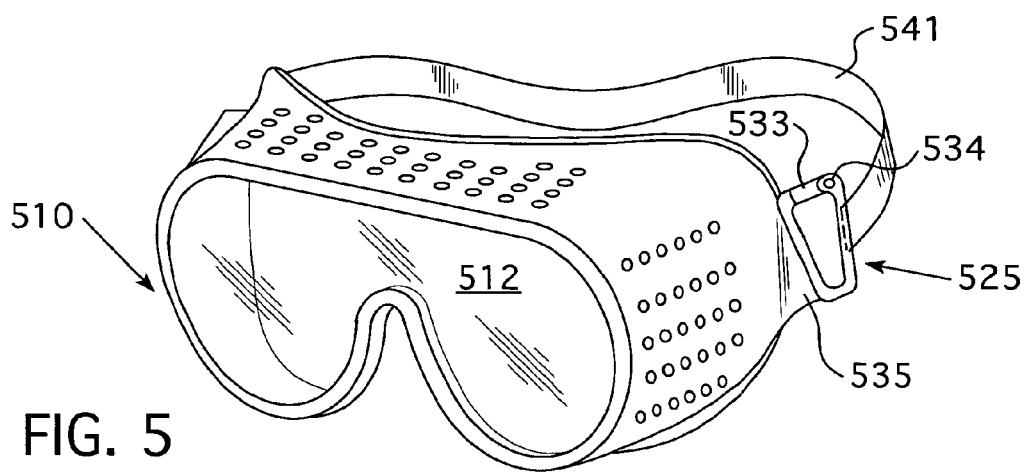
FIG. 5 is a left front perspective view of a pair of safety goggles having a carabiner clip incorporated into the left frame elastic band connector.

FIG. 5 shows an analogous clip arrangement to that of FIG. 4 but for a pair of elastically mounted safety goggles. The frame for same, element 510, also has a single lens 512 and a connector 535 with an integral clip 525 injected between the frame proper and the elastic strap 541.

Figure 6:
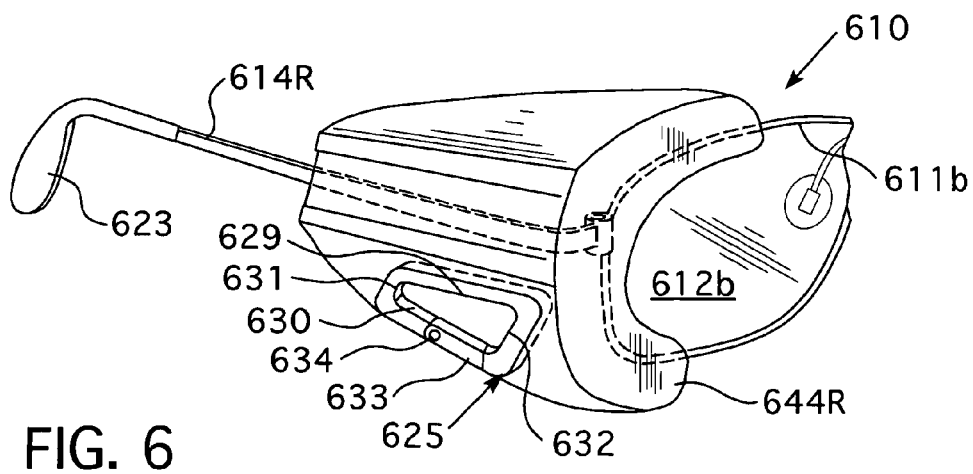
FIG. 6 is a right front perspective view of a pair of eyeglasses having a carabiner clip incorporated into the right side, add-on safety side shield.

FIG. 6 is another variant of safety glass frame 610 having side shields 644 extending upwardly along both temples. At the base of the right side shield, or 644R, toward the front end of right temple 614R, there is incorporated an integral carabiner clip 625 that is substantially triangular-shaped. Along the hypotenuse of that triangle is where the bar 633 and pivot pin 634 elements are duly situated.

Figure 7A:
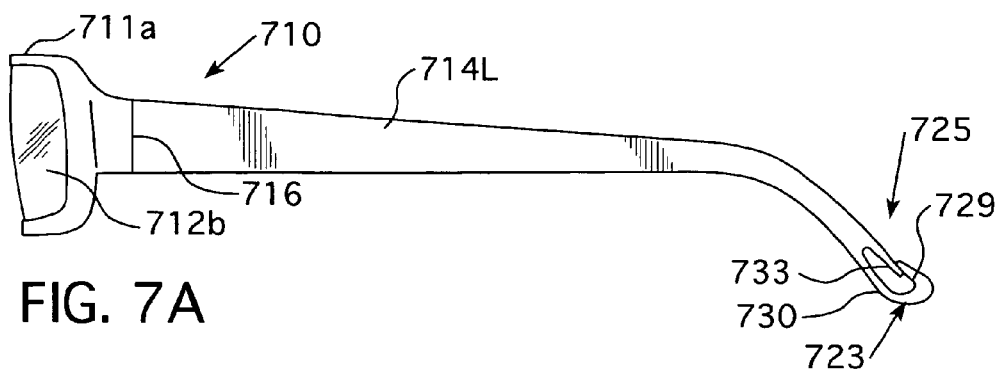
FIG. 7A is a fragmentary, front view of a right temple end having a carabiner clip incorporated into its top side according to another embodiment of this invention.
Figure 7B:
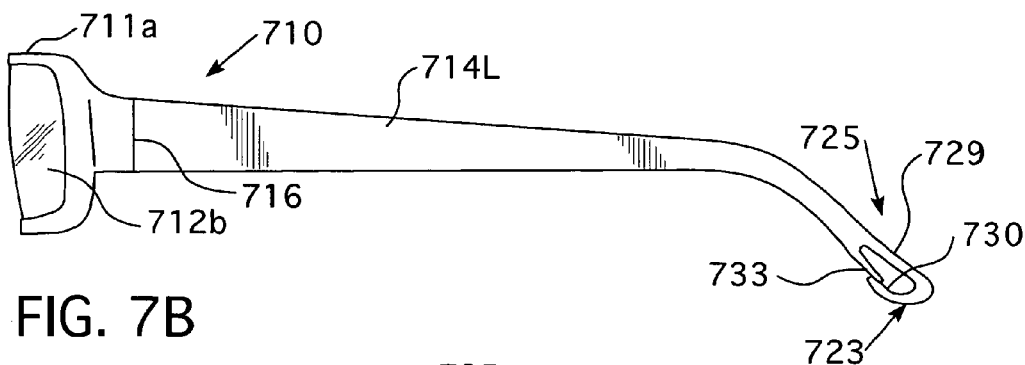
FIG. 7B is a fragmentary, front view of the right temple end having a carabiner clip incorporated into its bottom side.
Figure 7C:
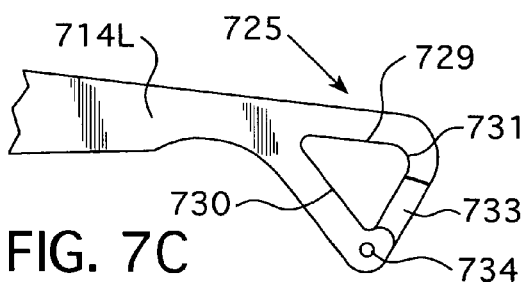
FIG. 7C is a fragmentary, front view of the right temple end having a carabiner clip incorporated into its rear lateral side.

As mentioned earlier, when the typical eyeglass frame includes a pair of temples, it is possible to incorporate at least one carabiner clip in the distant end of a temple rather than at the forward, hinge or other connector end. FIGS. 7A through C show variations of this invention wherein the temple proper, element 714 (L or R) has at its over the ear end portion 723 a simplistic, not overly complicated nor bulky, carabiner clip 725. In FIG. 7A, that clip would be arranged for opening and closing nearer the top side 729. That clip can be made mostly of a plastic or composite without having a separate, stand alone pivoting bar per se. FIG. 7B shows a first variation of this embodiment wherein the clip 725 is configured to open and close from the bottom, nearest to bottom side 730. FIG. 7C shows yet another embodiment with its clip 725 opening and closing closest to the ear end portion's most rearward, outer lateral side 731.

Figure 8A:
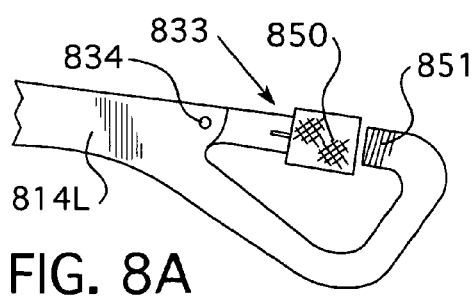
FIGS. 8A and B are fragmentary front views of a right temple end showing an alternate embodiment with the top carabiner clip having a sliding lock in both its unlocked (FIG. 8A) and locked (FIG. 8B) positions.
Figure 8B:
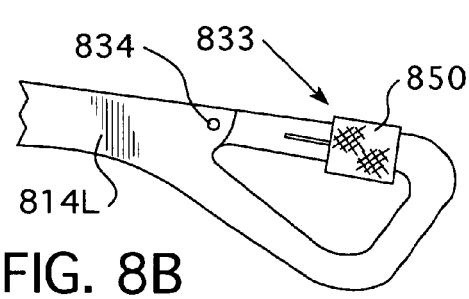

FIGS. 8A and B show one last variation of carabiner clip wherein the clip component for the same is locking, rather than non-locking per se. In FIG. 8A, the bar 833 to clip 825 has a sliding cover 850. When the clip is left "open" or unlocked, bar 833 can be pressed in (or down) and the eyeglasses secured to their wearer's apparel, belt loop, jewelry chain, etc. But to better secure the frame and prevent them from being inadvertently disconnected, some embodiments may provide the extra insurance of non-separation when sliding cover 850 is moved along the bar and joined to the opposite clip side. This can be accomplished by a threaded screw arrangement 851, or by other more permanent interconnecting means.

The foregoing detailed description of the invention has been made with reference to several preferred embodiments. Persons skilled in the art will comprehend that minor changes and variations do not depart from the spirit and the scope of the invention defined by the following claims.

What is claimed is:

1. An eyeglass frame comprising:
   (a) a main lens frame for holding one or more optical lenses, said lens frame having opposed lateral ends;
   (b) means for attaching the main lens frame to the wearer's head when in use; and
   (c) a carabiner clip extending from either: one lateral end of the main lens frame, or from the main lens frame attaching means at a section of said frame attaching means nearest the main lens frame, said carabiner clip having at least 3 sides, at least one of said sides including a bar connected to an adjacent clip side with spring biasing to define a closed position for said clip.

2. The eyeglass frame of claim 1 wherein the main lens frame is selected from the group consisting of: reading glasses, other vision correcting glasses, sunglasses, safety glasses, sportswear, a fashion accessory and combinations thereof.

3. The eyeglass frame of claim 1 wherein the main lens frame is designed to fit over another glass frame worn by the same individual.

4. The eyeglass frame of claim 1 wherein the attaching means includes a left and right temple component, each temple component having a main lens frame connecting end and an over-the-ear endpiece, said carabiner clip extending from the main lens frame connecting end of said temple component.

5. The eyeglass frame of claim 4 wherein one of the temple components includes a body section having a sized recess in which the carabiner clip may be stored when not in use.

6. The eyeglass frame of claim 5 wherein the recess is on an exterior face of the temple component nearer the main lens frame connecting end.

7. The eyeglass frame of claim 6 wherein the recess extends completely through a section of one temple component.

8. The eyeglass frame of claim 7 wherein the recess has at least one lipped section for preventing the carabiner clip from being pushed too far into or through the temple component.

9. The eyeglass frame of claim 7 wherein a perimeter of the sized recess includes at least one notch for assisting with extraction of the carabiner clip from the recess for use.

10. The eyeglass frame of claim 6 wherein the carabiner clip includes at least one detent for securing it within the recess when not in use.

11. The eyeglass frame of claim 6 wherein the recess is situated between an interior and an exterior face of the temple component nearer the main lens frame connecting end.

12. The eyeglass frame of claim 11 wherein the carabiner clip is pivotally mounted to rotate at least partially outside the temple component for use.

13. The eyeglass frame of claim 11 wherein the carabiner clip is slidably mounted to extend from between the temple component for use.

14. The eyeglass frame of claim 4 wherein each lateral end of the main lens frame has an end piece connected thereto with said temple components extending from said end pieces rather than directly from said main lens frame.

15. The eyeglass frame of claim 5 wherein the carabiner clip integrally forms a section of one temple component nearer the main lens frame connecting end.

16. The eyeglass frame of claim 1 wherein the carabiner clip bar is made from metal.

17. The eyeglass frame of claim 1 wherein the carabiner clip further includes a bar locking component.

18. An eyeglass frame comprising:
(a) a main lens frame for holding one or more optical lenses, said lens frame having opposed lateral ends;
(b) a left and right temple component, each component attached to an opposed lateral end of said main lens frame and each component including a main lens frame-connecting end and an over-the-ear endpiece; and
(c) at least one of said temple components including an integral carabiner clip that extends from the main lens frame-connecting end of the temple component, said carabiner clip having a plurality of sides one of which includes a spring biased bar that defines a closed position for securing the eyeglass frame to a loop on the wearer's clothing, jewelry or accessory when not in use.

19. The eyeglass frame of claim 18 wherein the main lens frame is selected from the group consisting of: reading or other vision correcting glasses, sunglasses, safety glasses, sportswear, a fashion accessory and combinations thereof.

20. The eyeglass frame of claim 18 wherein the temple component includes a body section having a recess in which the carabiner clip may be stored when not in use and from which the carabiner clip may be extracted for secure storage of the eyeglass frame when not in use.

21. An eyeglass frame comprising:
(a) a main lens frame for holding one or more optical lenses, said lens frame having opposed lateral ends; and
(b) a left and right temple component, each component attached to an opposed lateral end of said main lens frame, at least one of said temple components having a body section with a recess in which a carabiner clip may be stored and from which the carabiner clip may be extracted for securely storing the eyeglass frame when not in use, said carabiner clip having a plurality of sides one of which includes a spring biased, metal bar.

* * * * *